Jan. 27, 1953 K. E. RAU 2,626,559
PORTABLE BARBECUE OVEN
Filed Oct. 15, 1949 3 Sheets-Sheet 1
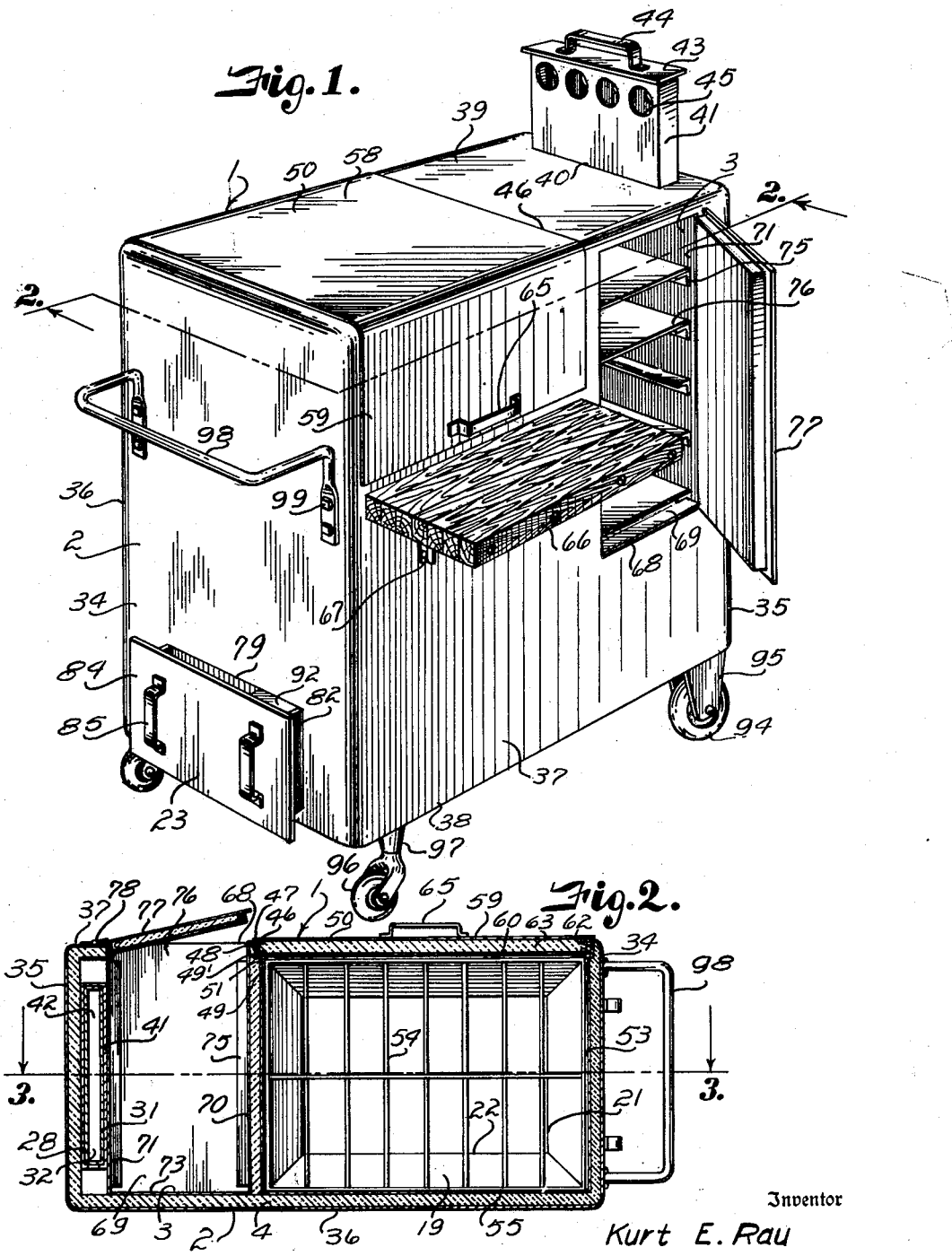
Inventor
Kurt E. Rau
By
Fishburn + Mullendore
Attorneys Jan. 27, 1953 K. E. RAU 2,626,559
PORTABLE BARBECUE OVEN
Filed Oct. 15, 1949 3 Sheets-Sheet 2

Inventor
Kurt E. Rau
By
Fishburn & Mullendore
Attorneys

Jan. 27, 1953　　　　　K. E. RAU　　　　　2,626,559
PORTABLE BARBECUE OVEN
Filed Oct. 15, 1949　　　　　　　　　　　　　3 Sheets-Sheet 3
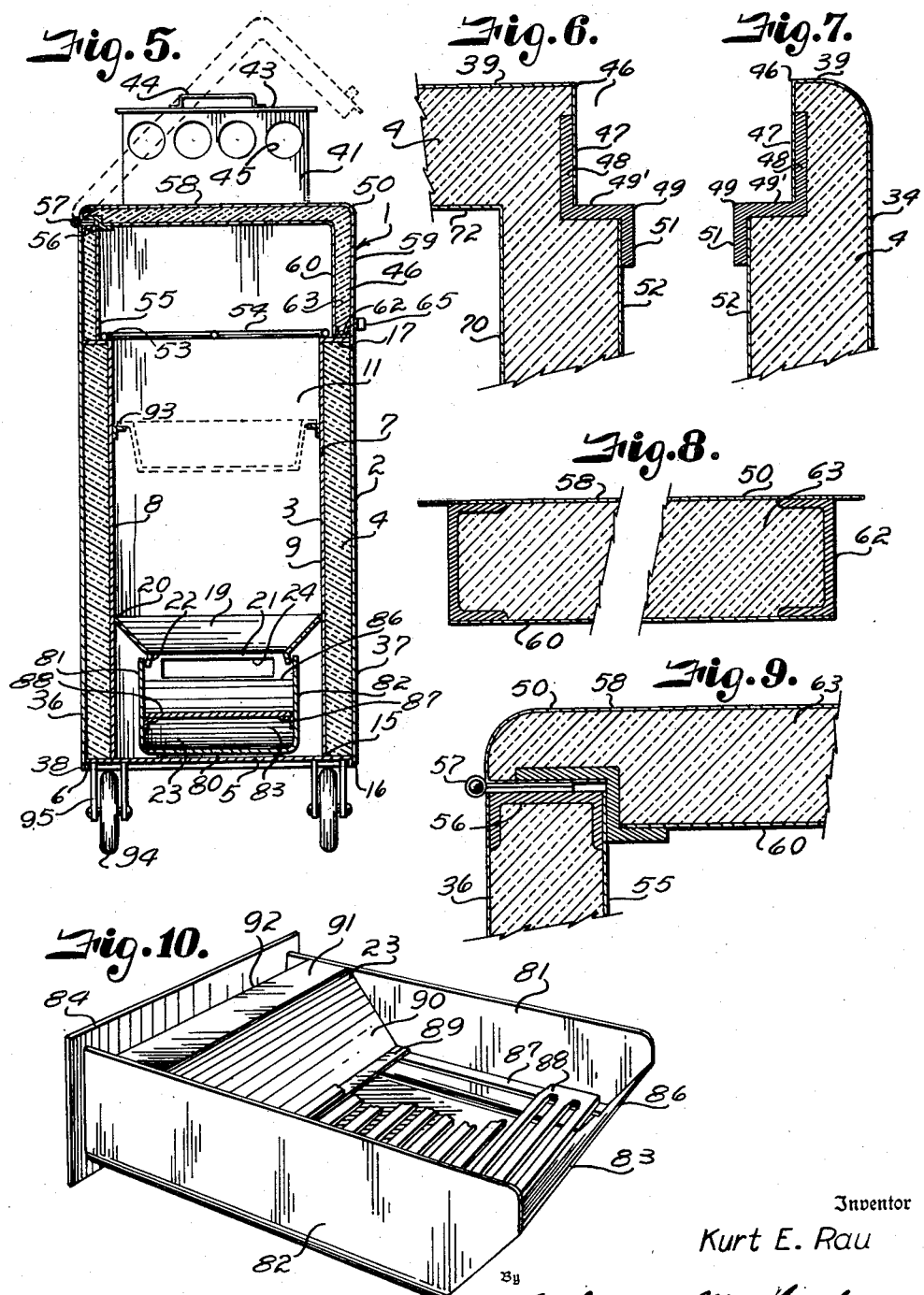
Inventor
Kurt E. Rau
By Fishburn + Mullendore
Attorneys Patented Jan. 27, 1953

2,626,559

UNITED STATES PATENT OFFICE 2,626,559

PORTABLE BARBECUE OVEN

Kurt E. Rau, Kansas City, Mo.

Application October 15, 1949, Serial No. 121,540

2 Claims. (Cl. 99—259)

This invention relates to barbecue ovens, and more particularly to a relatively light weight barbecue oven fabricated of metal and supported on wheels by which it may be easily moved from place to place.

The objects of the invention are to provide a portable barbecue oven structure which is fireproof and has a convenient grill, firebox and warming oven; to provide a barbecue oven with an insulated metal wall structure which is economical, easy to fabricate and assemble; to provide a barbecue ash and firebox removably mounted in the oven structure for placing fuel such as charcoal and the like therein, said firebox being arranged for movement to control draft therethrough, permit inspection of the burning fuel and application of sawdust or other wood material to the firebox for creating smoke in the oven for barbecuing, to provide a hinged cover on the oven for facilitating handling of the food during placing of the same in the oven, cooking and removal from the oven, to provide a telescoping flue on the oven whereby the outlet may be raised to induce draft and discharge smoke and fumes during cooking operations whereby the smoke does not interfere with the operator, said flue being adapted for movement substantially into the oven structure to form a compact unit for transportation or storage, to provide for directing grease and drippings into the ash and firebox; and to provide a portable barbecue oven which is of sturdy fireproof construction, efficient in operation and easy to maintain in a clean, sanitary condition.

In accomplishing these and other objects of the present invention, I have provided improved details of structure the preferred form of which is illustrated in the accompanying drawings wherein:

Fig. 1 is a perspective view of a portable barbecue oven, embodying the features of my invention.

Fig. 2 is a horizontal sectional view through the oven on the line 2—2, Fig. 1.

Fig. 5 is a vertical transverse sectional view through the oven on the line 5—5, Fig. 3.

Fig. 6 is a detailed sectional view illustrating the structure of the upper portion of the intermediate wall.

Fig. 7 is a detailed sectional view of the upper portion of the end wall of the barbecue oven.

Fig. 8 is a detailed transverse sectional view through the cover of the barbecue oven.

Fig. 9 is a detailed sectional view illustrating the hinge connection of the cover and wall of the barbecue oven.

Fig. 10 is a perspective view of the ash and firebox.

Figure 3:
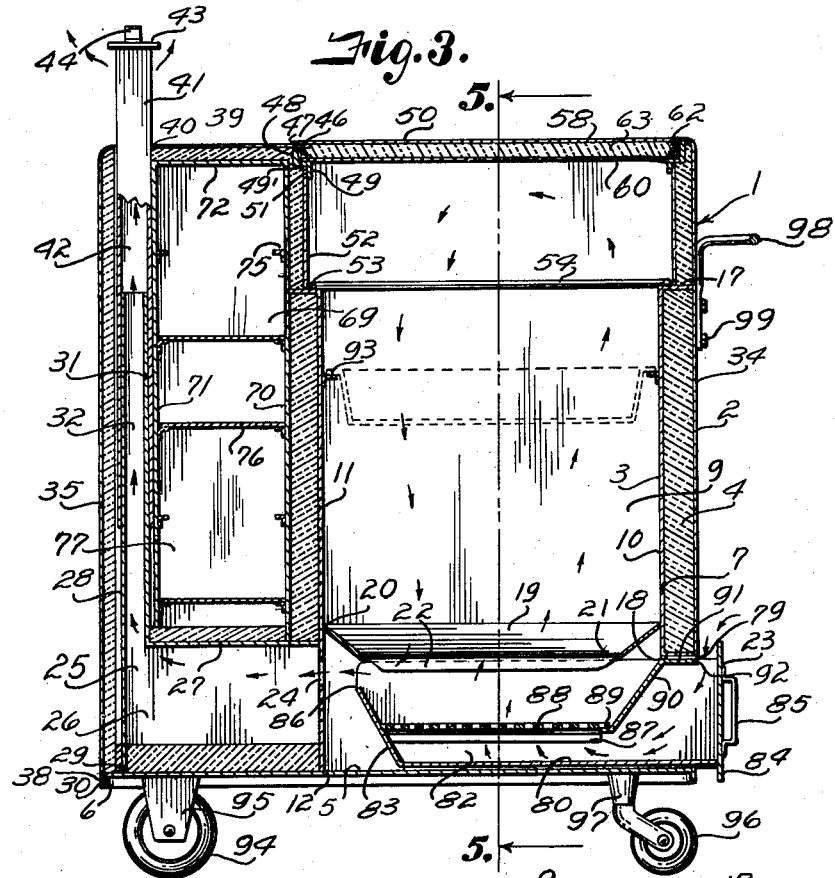
Fig. 3 is a vertical sectional view through the oven on the line 3—3, Fig. 2.
Figure 4:
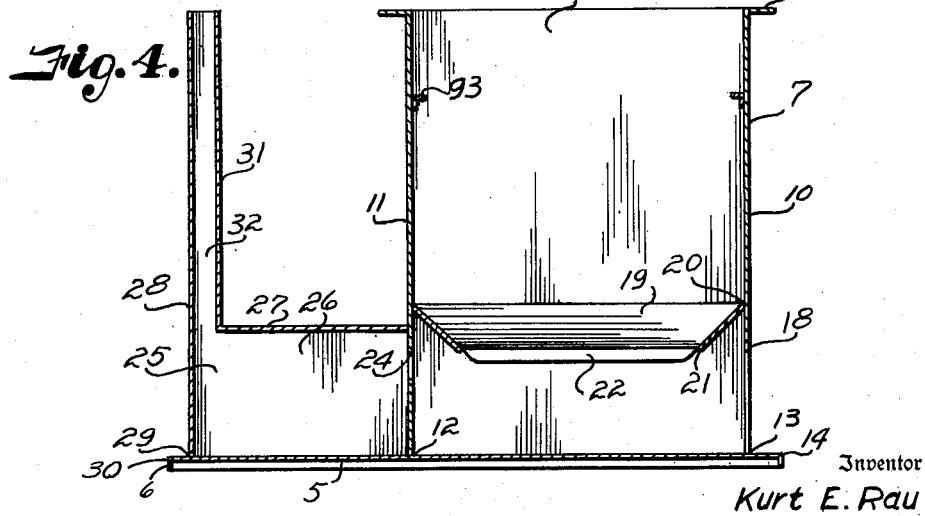
Fig. 4 is a vertical sectional view through the metal liner of the oven and flue section.

Referring more in detail to the drawings:

1 designates a portable barbecue oven consisting of a case having a spaced outer shell 2 and an inner liner 3 preferably of corrosion resistant sheet metal, the outer shell preferably being of aluminum or the like and the inner liner being stainless steel or the like. The space between the outer shell and inner liner is preferably filled with suitable insulation 4, such as glass wool or the like, to reduce the heat transfer through the walls thereof. The inner liner preferably consists of a base plate 5 of substantially rectangular shape and having downwardly turned edges forming a peripheral flange 6.

The inner liner includes a shell extending upwardly from the base plate 5, said shell having side walls 8 and 9 and end walls 10 and 11, the lower edges 12 of said walls being secured to the base plate with the end wall 10 spaced as at 13 from the end 14 of the base plate and the side walls 8 and 9 inset as at 15 from the sides 16 of the base plate. Flanges 17 are turned outwardly on the upper end of the side and end walls of the inner shell 7, said flanges being approximately the same width as the spacing of the respective walls from the sides and ends of the base plate. The lower portion of the shell 7 forms an ashpit and the wall 10 is provided with an opening 18 providing access to the pit.

Aprons 19 are secured as at 20 to the walls 8, 9, 10 and 11, and extend inwardly and downwardly from above the opening 18. The aprons on the end walls 10 and 11 terminate as at 21 and those on the side walls terminate in downwardly extending flanges 22 whereby the lower edges of said aprons cooperate with a movable ash and grease pan 23 as later described. The wall 11 is provided with an aperture 24, the upper edge of which is preferably on the same plane as the lower edges of the aprons 20, said aperture 24 serving to conduct smoke and the like from the inner shell into a flue chamber 25 having side walls 26 and a horizontal upper wall 27 being secured to the end wall 11 and to the side walls 26. The flue chamber is provided with an end wall 28 inset as at 29 from the rear end 30 of the base plate 5. Extending upwardly from the flue chamber is a flue connection 31, preferably rectangular in shape to form a restricted passage 32 therethrough, said flue extension preferably terminating at approximately the same height as the inner shell 7.

The outer shell 2 is provided with end walls 34 and 35 and side walls 36 and 37, the lower ends 38 of said walls being suitably secured to the flange 6 on the base plate 5. The side and end walls of the outer shell extend above the flange 17 of the inner shell and integral with the side and end walls of said outer shell is a top member 39. The rear portion of the top member 39 has an aperture 40 aligned with the flue connection 31 to slidably receive a stack member 41 having a rectangular passage 42 therethrough adapted to slidably engage the exterior surface of the flue connection 31, whereby the flue connection 31 and the stack member 41 form a telescoping stack. The upper end of the stack member 41 is provided with a closure 43 having a handle 44 thereon for facilitating movement of the stack member 41 upwardly and downwardly relative to the barbecue oven. The closure 43 has edges extending outwardly from the stack member 41 whereby when in collapsed position, said edges will engage the top member 39.

The walls of the stack member 41 are provided with a plurality of apertures 45 slightly below the closure member 43 whereby when the stack member is moved upwardly the openings will be exposed and air may pass therethrough to draw smoke and the like from the stack, the flue connection 31 and stack member 41 being of such relative length that when extended the openings 45 will be considerably higher than the barbecue oven and the smoke will be discharged above the operator and provide no discomfort to him.

The top member 39 and side wall 37 of the outer shell are provided with an upper opening 46 to provide access to the cooking oven. The side edges of the opening 46 are turned inwardly to form flanges 47 which are secured to a flange 48 of a Z-bar 49 forming a frame around the opening, the web 49' of said Z-bar providing a ledge for receiving a cover 50 as later described. The other flange 51 of the Z-bar is secured to panels 52 which extend downwardly and have their lower edges resting on the flanges 17 of the inner shell in spaced relation to the walls 10 and 11 to provide a ledge 53 adapted to support a broiling grate 54. Inset from the wall 8 and having its lower edge resting on the flange 19 is a panel 55 spaced from the outer shell side wall 36, said panel 55 extending upwardly from the flange 17 and having its upper portion connected to the flange of a channel member 56 which closes the space between the wall 36 and the panel 55. The upper surface of the channel 56 preferably is below the top wall 39 and has one leaf of a hinge 57 secured thereto and the other leaf secured to the top panel of the cover 50 to hingedly mount same to close the opening 46.

The cover 50 consists of the top panel 58 and front panel 59 of suitable size whereby the side edges of said panels overlap the top wall 39 and side wall 37 when the cover is in closed position. The cover preferably is provided with an inner panel 60, spaced from the outer panels thereof and having its edges secured to channel members 62 for enclosing suitable insulation such as fibreglass 63 whereby the insulated depending portion of the cover formed by the channels and panel 60 extends into the door opening 46 adjacent the flanges 47 to provide a suitable closure therefor. The lower edge of the front panel is provided with a handle 65 for facilitating moving of the cover and providing access to the cooking portion of the barbecue oven. A suitable board 66 or the like is preferably secured by brackets 67 to the side wall 37 below the top opening in said side wall whereby meat and the like may be moved from the broiling grate onto the board for carving and the like.

The side wall 37 is provided with an opening 68 leading to a warming oven 69 formed by side walls 70 and 71, top wall 72, and a rear wall 73, the wall 71 being in engagement with the stack member 41 whereby heat from the smoke and products of combustion is transmitted to the warming oven. The walls 70, 72 and 73 are spaced from the adjacent walls of the outer shell 2 and inner shell 7 and suitable insulation arranged in said space to limit the transfer of heat therethrough. Also all other spaces between the walls of the inner and outer shells are provided with suitable insulation to minimize the escape of heat from the barbecue oven. The walls 70 and 71 of the warming oven are provided with a plurality of spaced angle brackets 75 providing support for shelves 76 to support articles in the warming oven. Hingedly mounted on the wall 37 is a door 77 which is preferably formed of spaced panels with insulation therebetween whereby the door may be moved on the hinges 78 to provide access to the warming oven and when moved to closed position the insulated portion closes the opening and the flanges of the outer panel engage the outer surface of the wall 37 surrounding the opening 68.

The end wall 34 of the outer shell 33 is preferably provided with an opening 79 aligning with the opening 18 in the inner shell, the edges of the wall 34 surrounding said opening preferably being turned inwardly to engage said inner shell to aid in holding the insulation between the shells. Slidably mounted on the upper surface of the base plate 5 is the removable ash and grease pan 23, the pan 23 consists of a bottom 80, side walls 81 and 82, an upwardly sloping inner end wall 83, and an outer end plate 84 secured to the side and bottom walls, the plate 84 having marginal edges adapted to overlie the end wall 34 adjacent the opening 79, handles 85 being provided on the end plate 84 to facilitate moving the pan. The side walls 81 and 82 are substantially the same height as the opening 79, but the inner end wall 83 is preferably arranged on a slope and has its upper edge spaced below the upper edge of the side walls to provide a passage between the upper edge 86 of the inner end wall and the lower edge of the aprons 20 arranged in the inner shell of the barbecue oven, said passage aligning with the aperture 24 in the wall 11.

Angle brackets 87 are secured to the side walls 81 and 82 in spaced relation to the bottom 80 for supporting the sides of a removable grate 88, the inner edge of said grate being in engagement with the end wall 83 and the outer edge resting on a flange 89 of a partition 90 which slopes upwardly and outwardly toward the end plate 84 and terminating in a flange 91 substantially in alignment with the upper edge of the side walls 81 and 82, the free edge of said flange being spaced as at 92 from the end plate 84 to provide a passage for air when the pan is positioned as shown in Fig. 3. The partition 90 extends across the pan 23 and is secured to the side walls 81 and 82. The pan, being removably mounted in the oven structure, permits same to be drawn outwardly for applying fuel onto the grate 80 and when moved inwardly whereby the plate 84 engages the end wall 34 substantially no air will enter to support combustion of the fuel. When the pan is moved outwardly as shown in Fig. 3, air will enter the space between the flange 91 and the end plate 84 and flow under the grate 88 to support combustion of the fuel, the heat, smoke and the like going up into the barbecue oven but having to move downwardly through the passage 87, opening 24, flue chamber 25, flue connection 31 and stack member 41 to the atmosphere.

It is preferable to use charcoal or the like on the grate 88 as it will retain the fire for a considerable period of time and is relatively slow burning. Sawdust or the like may be placed over the charcoal and wet down with water as desired to create the smoke for barbecuing and the like. It is preferable to provide the walls 10 and 11 of the inner liner with angle brackets 93 spaced below the ledge 53 for supporting pans or other grates as desired in preparing food.

In order to make the oven portable, a pair of wheels 94 is supported by brackets 95 which are secured to the bottom plate 5 adjacent the rear end 30 thereof and a pair of caster wheels 96 is mounted on caster brackets 97 which are suitably mounted on the bottom plate adjacent the forward end thereof. Also a handle 98 is secured to the end wall 34 by suitable fastening devices 99 to facilitate pushing or otherwise moving the barbecue oven to a place of use.

In using a portable barbecue apparatus constructed as described, the handle 98 is grasped and the device wheeled to a suitable location for use. The handle 44 on the stack member 41 is grasped and said stack member extended upwardly to position the openings 45 therein well above the top member 39 of the device. The pan 23 is drawn outwardly and suitable fuel, for example charcoal, placed on the grate 88 with kindling or the like for starting a fire. After the kindling is ignited, the pan is moved inwardly to position the flange 91 under the end walls whereby air may enter through the passage 92, pass under the grate and through the fuel to support combustion of same, the products of combustion going upwardly in the barbecue oven as shown by the arrows in Fig. 3 and then downwardly through the aperture 24 and out through the stack. After the charcoal has been thoroughly ignited, the pan is again withdrawn and wet sawdust or other wood to create smoke placed on the charcoal; then the pan is returned to the position shown in Fig. 3.

The cover 50 is hinged upwardly to provide access to the broiling grate 54 and meat or other food desired to be barbecued is placed thereon and the cover again closed. By movement of the pan 23, the size of the passage 92 may be varied to reduce the draft on the fuel. Smoke created by the wood on the charcoal causes smoke, together with heat, to pass upwardly in the barbecue oven, slowly cooking the meat on the grate 54 and then said smoke passes downwardly through the oven and through the stack. The heated smoke passing through the stack will cause a transfer of heat through the wall 71 into the warming oven, for maintaining any food therein in a warm condition. As the food is cooked grease or juices will drop downwardly through the oven onto the fuel in the pan 23, the aprons 20 deflecting any of the grease that is near the walls of the oven into said pan. Also the ashes from the fuel will drop onto the bottom 89 of the pan whereby the greasy areas will be concentrated on the aprons and in the pan simplifying cleaning operations. When it is desired to inspect the meat, the cover may be lifted, providing easy access to the entire cooking area. The arrangement of the fuel and outlet to the stack and the closed barbecuing or cooking chamber as well as the height of the grate above the fire prevents burning the meat but assures an adequate quantity of smoke and heat in the oven to thoroughly cook and flavor same. After the cooking or barbecuing is completed, the fire may be extinguished, the stack member 41 pushed downwardly to telescope same over the flue connection 31 and the entire barbecuing apparatus wheeled into a place of storage. All of the walls being insulated, the apparatus may be made of sheet metal whereby the entire apparatus is light in weight, easy to clean and efficient in operation.

What I claim and desire to secure by Letters Patent is:

1. In a portable barbecue having a case defining a cooking space with a grate supported in the upper portion of the cooking space for supporting food to be cooked and an opening in the case at the lower portion of the cooking space, an ash pan slidable in the lower portion of the cooking space and having an end adapted to close the opening in the lower portion of the cooking space, said pan having a bottom and upwardly extending side and inner end walls, a fuel grate in the ash pan spaced from the bottom thereof with one end adjacent the inner end wall and the other end spaced from the ash pan end which closes the opening in the case, a transverse partition in the ash pan secured to the side walls thereof and extending from said other end of the grate and terminating adjacent the upper edges of the walls of the ash pan in spaced relation to the end which closes the opening in the case whereby when the pan is moved to open the opening air will enter between said end and partition and be directed under the fuel grate to support combustion of the fuel, the smoke and heat moving up in the cooking space, baffles mounted in the cooking space above the side and end walls of the ash pan for directing drippings from the cooking food onto fuel on the fuel grate to wet same and facilitate formation of smoke, a smoke vent communicating with the lower portion of the cooking space between the ash pan and dripping baffle, and a smoke stack mounted in the casing in spaced relation to the cooking space and having communication with the smoke vent to produce a draft in the cooking space.

2. In a portable barbecue having a case defining a cooking space with means in the upper portion of the cooking space for supporting food to be cooked and an opening in the case at the lower portion of the cooking space, an ash pan slidable in the lower portion of the cooking space and having an end adapted to close the opening in the lower portion of the cooking space, said pan having a bottom and upwardly extending side and inner end walls, a fuel grate in the ash pan spaced from the bottom thereof with one end adjacent the inner end wall and the other end spaced from the ash pan end which closes the opening in the case, a transverse partition in the ash pan secured to the side walls thereof and sloping upwardly from said other end of the grate and terminating adjacent the upper edges of the walls of the ash pan in spaced relation to the end which closes the opening in the case whereby when the pan is moved to open the opening air will enter between said end and partition and be directed under the fuel grate to support combustion of the fuel, the smoke and heat moving up in the cooking space, baffles mounted in the cooking space above the side and end walls of the ash pan and sloping downwardly and inwardly to project over the walls of the ash pan for directing drippings from the cooking food onto fuel on the fuel grate to wet same and facilitate formation of smoke, a smoke vent communicating with the lower portion of the cooking space between the ash pan and dripping baffles and remote from the opening in the case, and a smoke stack having communication with the smoke vent to produce a draft to the cooking space.

KURT E. RAU.

REFERENCES CITED

The following references are of record in the file of this patent:

UNITED STATES PATENTS

| Number | Name | Date |
|---|---|---|
| 226,862 | Kellogg | Apr. 27, 1880 |
| 416,504 | Schaeffer | Dec. 3, 1889 |
| 1,438,345 | Tait et al. | Dec. 12, 1922 |
| 1,595,846 | Wood | Aug. 10, 1926 |
| 1,616,663 | Macomber | Feb. 8, 1927 |
| 2,060,004 | Ebberts | Nov. 10, 1936 |
| 2,109,796 | Hirschenfeld | Mar. 1, 1938 |
| 2,143,999 | Rosson | Jan. 17, 1939 |
| 2,196,035 | Shaw | Apr. 2, 1940 |
| 2,452,180 | Burkert | Oct. 26, 1948 |